(12) United States Patent
Benoit et al.

(10) Patent No.: US 9,829,572 B2
(45) Date of Patent: Nov. 28, 2017

(54) PASSIVE DEVICES FOR BROADBAND ACOUSTIC ACQUISITION AND PASSIVE SYSTEMS FOR BROADBAND ACOUSTIC IMAGERY

(71) Applicant: ACB Engineering, Herblay (FR)

(72) Inventors: Vincent Benoit, Herblay (FR); Christian Corbeau, Le Mesnil Saint Denis (FR)

(73) Assignee: ACB ENGINEERING, Herblay (FR)

( * ) Notice: Subject to any disclaimer, the term of this patent is extended or adjusted under 35 U.S.C. 154(b) by 518 days.

(21) Appl. No.: 14/150,099

(22) Filed: Jan. 8, 2014

(65) Prior Publication Data
US 2014/0192201 A1 Jul. 10, 2014

(30) Foreign Application Priority Data
Jan. 8, 2013 (FR) ...................................... 13 50159

(51) Int. Cl.
*G01S 15/89* (2006.01)
*G01H 3/12* (2006.01)
*G01H 3/00* (2006.01)
*G01H 17/00* (2006.01)
*G01S 7/52* (2006.01)

(52) U.S. Cl.
CPC ......... *G01S 7/52023* (2013.01); *G01H 3/125* (2013.01); *G01S 15/8915* (2013.01); *G01H 3/00* (2013.01); *G01H 17/00* (2013.01); *G01S 15/89* (2013.01); *G01S 15/8925* (2013.01); *H04R 2430/20* (2013.01)

(58) Field of Classification Search
None
See application file for complete search history.

(56) References Cited

U.S. PATENT DOCUMENTS

| 7,058,184 | B1* | 6/2006 | Hickling | ................. | G01H 3/00 |
| | | | | | 381/92 |
| 2005/0225497 | A1* | 10/2005 | Christensen | ............ | H01Q 3/26 |
| | | | | | 343/893 |
| 2006/0080418 | A1* | 4/2006 | Wu | ....................... | G01H 17/00 |
| | | | | | 709/220 |

(Continued)

OTHER PUBLICATIONS

French Search Report, dated Oct. 21, 2013, from corresponding French application.

*Primary Examiner* — Joseph Ustaris
*Assistant Examiner* — William Adrovel
(74) *Attorney, Agent, or Firm* — Young & Thompson (57) ABSTRACT

Passive device for broadband acoustic acquisition (3) that can communicate with a digital processing unit (4), the device including a plurality of microphone sensors (7) that can generate an electric signal (8) that is representative of an acoustic pressure (9) received, electronics for processing and digitizing (12) electric signals being able to adapt the electric signals and transform them into digital signals (13) of acoustic pressure, transfer electronics (14) being able to communicate with a digital processing unit (4) and to make possible the transfer of the digital signals of acoustic pressure to the digital processing unit. The microphone sensors and the transfer electronics are mounted on a multifunctional rigid support element (17) that incorporates the processing and digitizing electronics.

20 Claims, 3 Drawing Sheets

(56) References Cited

U.S. PATENT DOCUMENTS

| | | | |
|---|---|---|---|
| 2007/0044559 A1* | 3/2007 | Andrews | G01N 29/4427 73/584 |
| 2007/0195646 A1* | 8/2007 | Govindswamy | G01S 15/89 367/88 |
| 2008/0034869 A1 | 2/2008 | Heinz et al. | |
| 2010/0316231 A1* | 12/2010 | Williams | H04R 3/005 381/92 |
| 2011/0120222 A1* | 5/2011 | Scholte | G01H 3/125 73/603 |
| 2011/0164466 A1* | 7/2011 | Hald | G01H 3/125 367/8 |
| 2011/0222372 A1* | 9/2011 | O'Donovan | G01S 3/8083 367/103 |
| 2012/0275261 A1* | 11/2012 | Kim | G01S 7/52047 367/7 |
| 2012/0287749 A1* | 11/2012 | Kutlik | G01H 3/125 367/7 |
| 2014/0313859 A1* | 10/2014 | Hald | G10K 11/346 367/138 |

* cited by examiner

PASSIVE DEVICES FOR BROADBAND ACOUSTIC ACQUISITION AND PASSIVE SYSTEMS FOR BROADBAND ACOUSTIC IMAGERY

The invention relates to passive devices for broadband acoustic acquisition and passive systems for broadband acoustic imagery operating in the audible frequency range conventionally defined from 20 Hz to 20,000 Hz.

In particular, the devices and systems according to the invention are notably different from ultrasonic acoustic systems such as those used in, for example, echography, the latter operating at much higher frequency and being ordinarily active systems that emit acoustic signals in the observation zone.

The devices and systems according to the invention are thus closer, in their use and general operating principle, to a thermal camera.

More particularly, the invention relates to a device for broadband acoustic acquisition able to communicate with a digital processing unit, the device comprising:

a plurality of microphone sensors, each of the sensors being able to generate an electric signal that is representative of an acoustic pressure received by said microphone sensor, electronics for processing and digitizing the electric signals able to adapt the electric signals generated by the microphone sensors and to transform them into digital signals of acoustic pressure, transfer electronics able to communicate with a digital processing unit and to make possible the transfer of the digital signals of acoustic pressure to said unit.

Broadband acoustic antennas having a large number of microphone sensors are well known in the state of the art.

Such acoustic antennas are usually provided with fifty to several hundred microphone sensors and are carried by a rigid structure that is often attached to one or more feet.

The document U.S. Pat. No. 5,838,284 describes an example of one such acoustic antenna having a hundred microphone sensors arranged to form a spiral structure.

General electronics for processing and digitizing electric signals are also known in the state of the art and consist of a series of modules connected to the antenna by one or more large-section cables. These modules make possible the galvanic isolation and the excitation of the passive microphone sensors as well as the amplification, prefiltering and digitizing of the electric signals coming from the sensors.

The processing and digitizing electronics usually have a complete acquisition chain for each microphone sensor of the acoustic antenna and therefore have considerable size and bulk, usually constituting several kilograms to several tens of kilograms on the whole.

Thus, the passive devices and systems for acoustic imagery are presently designed as devices of respectable size that must be operated in the following way:

an operator selects a position for the acoustic antenna so as to direct it toward a zone of the object to be examined, and installs the antenna on its stand or stands;

the operator connects and then places, in an office automation-type arrangement, the elements of the processing and digitizing system as well as the digital processing unit that is usually a portable computer;

finally, the operator produces the acoustic imagery of the zone of the object to be examined.

If a spatial exploration is necessary, for example, to examine different zones of the object, the operator successively selects several sites for the acoustic antenna and moves it with its stand to the different sites before repeating the measurement.

When the sites are far from one another, for example during the examination of objects or of structures of large size, it can be necessary to move and redeploy the system as a whole, comprising the processing and digitizing electronics as well as the digital processing unit, to the different sites.

To simplify this operation, it is known to make it possible to move only the acoustic antenna around the object to be examined, the acoustic antenna being connected to the processing and digitizing electronics by sufficiently long large-section cables.

Such a device cannot, however, be used in many situations either because of a displacement amplitude that is too limited by the cables, or because of the impossibility in fact of approaching the object to be examined without danger of the cables, for example if the object is moving or comprises moving elements (wind turbine, transmission motor, gearing, automated space, . . . ).

The problem at the root of the invention is to provide such a passive device for acoustic acquisition and such a passive system for acoustic imagery that can be deployed and operated simply and quickly.

The problem at the root of the invention is to provide such a passive device for acoustic acquisition and such a passive system for acoustic imagery that can be moved easily and without danger by an operator and in particular that can function during the movement.

The problem at the root of the invention is to provide such a passive device for acoustic acquisition and such a passive system for acoustic imagery that make possible the easy and simplified exploration of cluttered zones.

Hereafter, a summary of the invention as characterized in the claims.

In preferred embodiments of the invention, it is optionally possible to have recourse to one and/or the other of the following arrangements:

the plurality of microphone sensors comprises a number of microphone sensors that is greater than or equal to three and less than or equal to sixteen, the number of microphone sensors being preferably greater than or equal to six and less than or equal to twelve, the number of microphone sensors being preferably approximately equal to eight, for any first sensor selected from among the plurality of microphone sensors and any second sensor selected from among the plurality of microphone sensors, a maximum distance between the first sensor and the second sensor is less than or equal to fifty centimeters, said maximum distance being preferably less than or equal to thirty-five centimeters, said maximum distance being preferably approximately equal to twenty centimeters, for any first sensor selected from among the plurality of microphone sensors and any second sensor selected from among the plurality of microphone sensors, a minimum distance between the first sensor and the second sensor is greater than or equal to four centimeters, sensors from among the plurality of microphone sensors are placed approximately in a circle, sensors from among the plurality of microphone sensors are placed in the interior of said circle, the multifunctional rigid support element has a plurality of receptacles, and each sensor from among the plurality of microphone sensors is mounted in an associated receptacle among the plurality of receptacles, the passive device for acoustic acquisition further has at least one distance sensor incorporated in the multifunctional rigid support element, the passive device for acoustic acquisition comprises two optical distance sensors incorporated in the multifunctional rigid support element, the multifunctional rigid support element has a means for association with a digital processing unit that is able to attach a digital processing unit rigidly to the multifunctional rigid support element, the multifunctional rigid support element has a rigid shell in which the processing and digitizing electronics are housed, the multifunctional rigid support element has two rigid shells attached opposite one another and containing between them the processing and digitizing electronics, the multifunctional rigid support element is perforated, the multifunctional rigid support element has a grasping means able to make possible handling and carrying of the acoustic acquisition device with one or two hands, in particular a zone or zones of a rigid shell or of rigid shells, the multifunctional rigid support element has a means for fastening to an external support, in particular to a tripod stand, the transfer electronics are either wire transfer electronics having a connector and able to communicate with the digital processing unit by an interconnection cable, or wireless transfer electronics having an antenna or an optical emitter-receiver and able to communicate with the digital processing unit by means of a wireless connection, in particular a wireless radiofrequency connection or a wireless optical connection, the passive device for acoustic acquisition further has an autonomous electric power source incorporated in the multifunctional rigid support element, in particular a battery.

The invention also has as its object a passive device for broadband acoustic acquisition for an observation zone, the system having a passive device for acoustic acquisition as described above, a digital processing unit suited to receive digital signals of acoustic pressure from the passive device for acoustic acquisition and to determine and store, for each of the points of a plurality of points of the observation zone, at least one digital value of the acoustic pressure level at this point from the digital signals of acoustic pressure, and a means for displaying a grid of the digital values of the acoustic pressure level associated with each point of the observation zone.

In preferred embodiments of the invention, it is optionally possible to have further recourse to one and/or the other of the following arrangements:

the digital processing unit is attached rigidly to the multifunctional rigid support element, the display means has a touch screen able to make possible the communication of commands to the digital processing unit, the passive device for acoustic acquisition further has a means for acquisition of photographic images to obtain at least one photographic image of the observation zone, and the display means is able to display the photographic image of the observation zone and the grid of the digital values of the acoustic pressure level, in particular in the form of a palette of colors or of the gray level associated with the grid of the digital values and superposed with the photographic image, a mobile apparatus comprises the digital processing unit, the display means and the means for acquisition of photographic images, the mobile apparatus having an autonomous electric power source, in particular a battery, the mobile apparatus and the plurality of microphone sensors are respectively placed on opposite faces of the multifunctional rigid support element, and the multifunctional rigid support element has a through opening opposite the means for acquisition of photographic images able to make it possible for the means for acquisition of photographic images to acquire an image of the observation zone, the passive device for acoustic acquisition is supplied with electric power by the digital processing unit, a thickness dimension of the passive system for broadband acoustic imagery is less than twenty centimeters, preferably less than ten centimeters, and still more preferably less than five centimeters.

Made in this way, the passive device for acoustic acquisition and the passive system for acoustic imagery are compact, portable, lightweight, easy to use, rapidly installed and able to make possible the exploration of cluttered zones.

Other characteristics and advantages of the invention will be brought out in the following description of several of its embodiments, given by way of nonlimiting example, with regard to the attached drawings.

In the drawings:

In the various figures, the same references designate identical or similar elements.

Figure 1:
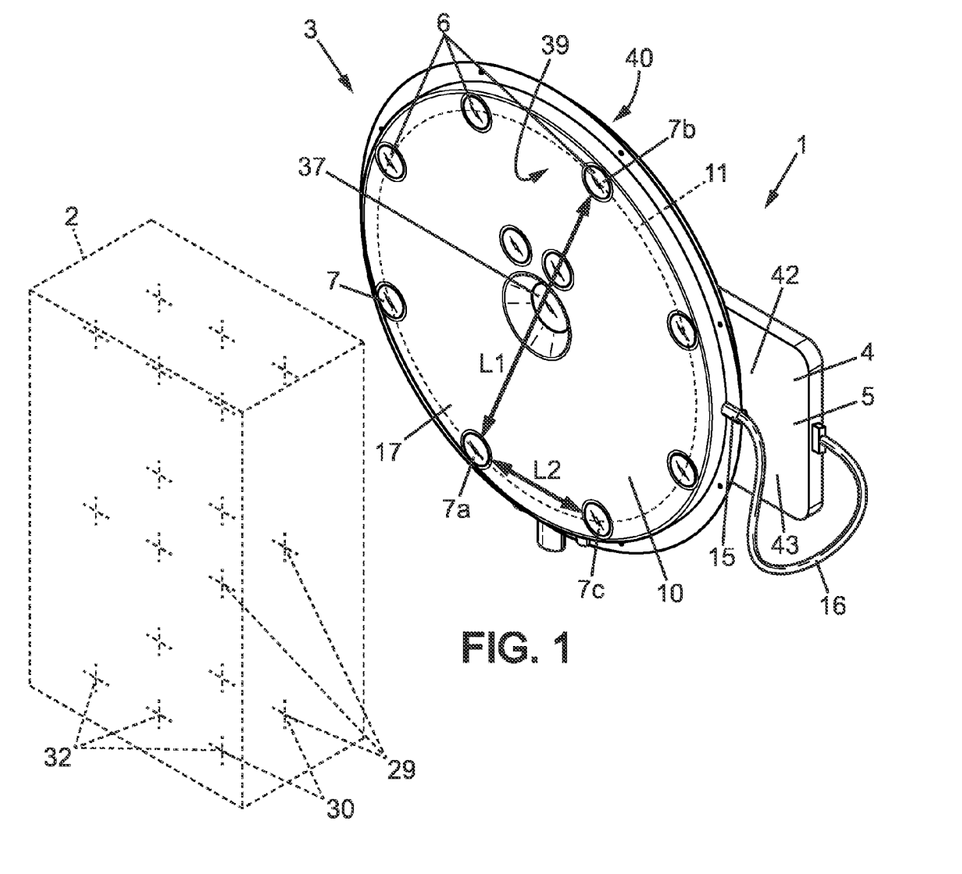
FIG. 1 is a diagrammatic view in perspective of a passive system for acoustic imagery and of a passive device for acoustic acquisition according to an embodiment of the invention.
Figure 2:
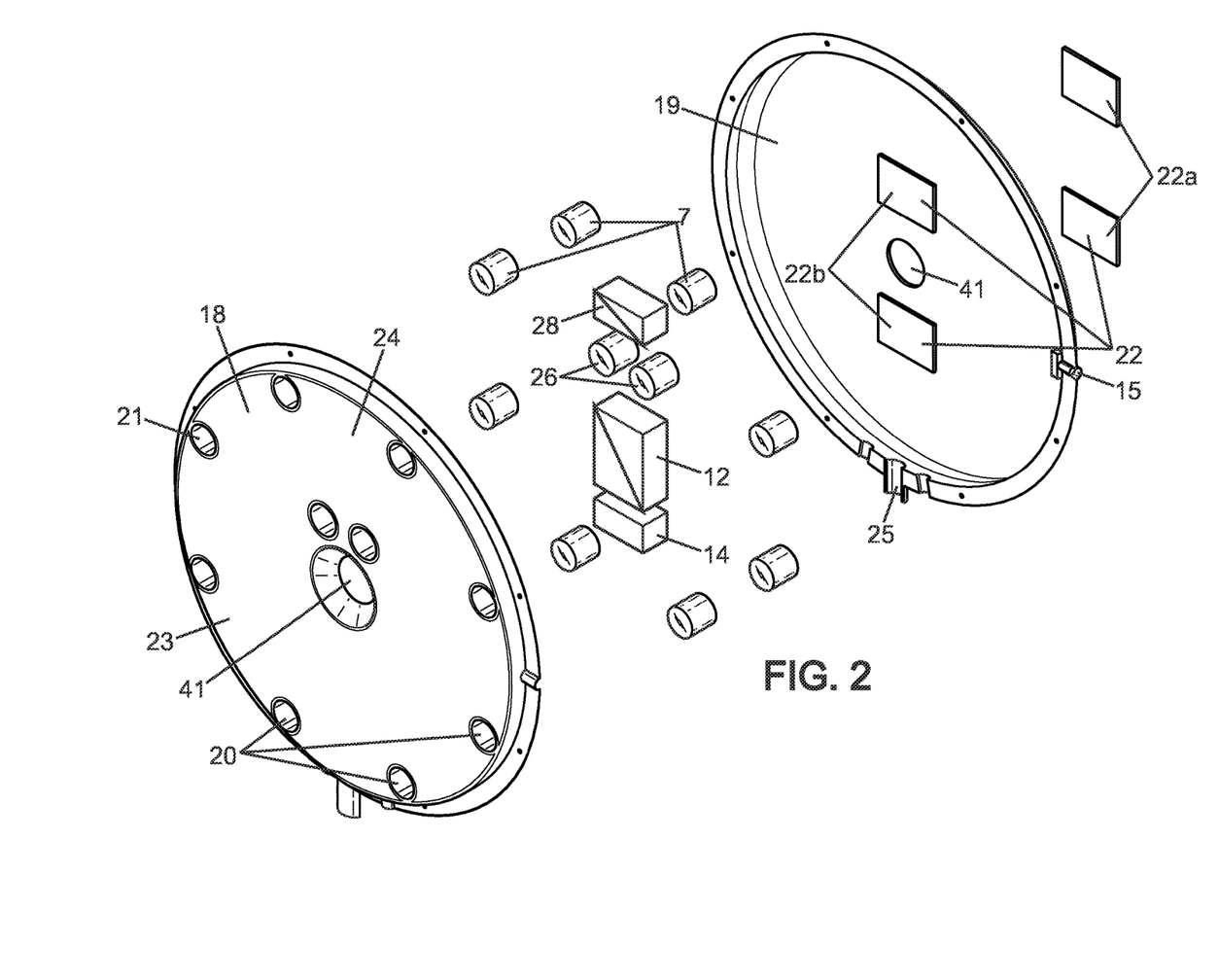
FIG. 2 is a diagrammatic view of an exploded view of the passive device for acoustic acquisition of FIG. 1.
Figure 3:
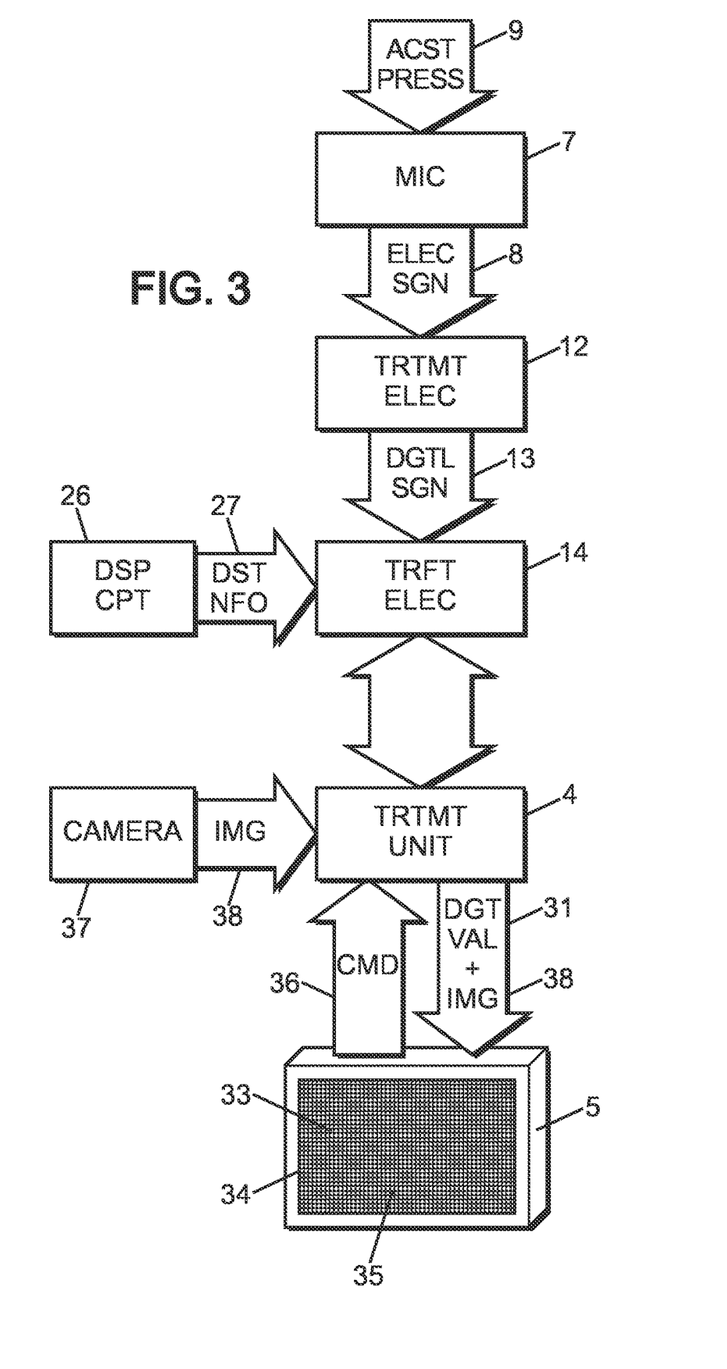
FIG. 3 is a flow chart for operation of a passive system for acoustic imagery according to an embodiment of the invention.

FIGS. 1 to 3 show a passive system for broadband acoustic imagery 1 according to a first embodiment of the invention.

Such a system is able to operate in the audible frequency range conventionally defined from 20 Hz to 20,000 Hz and makes it possible to produce the acoustic imagery of an observation zone 2.

The system 1 is passive, i.e., it is able to produce the imagery of the observation zone 2 without, in order to do this, having to emit acoustic pulses, in particular in the audible frequency range.

Such a system is therefore notably different from an ultrasonic acoustic system such as those used in, for example, echography, the latter operating at much higher frequency and being ordinarily active systems that emit acoustic signals in the observation zone.

Such a system according to the invention is thus closer to a thermal camera, in its use and in its general operating principle.

The passive system for broadband acoustic imagery 1 has a passive device for acoustic acquisition 3, a digital processing unit 4, and a display means 5.

The passive device for acoustic acquisition 3 comprises a plurality 6 of microphone sensors 7.

Each of the sensors 7 is able to generate at least one electric signal 8 that is representative of an acoustic pressure 9 received by the microphone sensor 7.

The electric signals 8 can in particular be analog electric signals.

The microphone sensors 7 can be of any known type. In particular, the sensors 7 can be transducers operating in the audible frequency range, for example between 20 Hz and 20,000 Hz.

The sensors 7 can be, for example, electromagnetic transducers (in which an acoustic pressure 9 or an acoustic pressure gradient 9 sets in motion a membrane placed in a magnetic field), electrostatic transducers (in which an acoustic pressure 9 or an acoustic pressure gradient 9 sets in motion a membrane whose movement induces a variation in capacitance of a capacitor), piezoelectric transducers (in which a button comprising a piezoelectric compound makes a variable capacitor that translates an acoustic pressure 9 into a voltage at the terminals of a load resistor) or any other type of known microphone sensor.

In the embodiment of FIGS. 1 to 3, the plurality 6 of microphone sensors 7 comprises eight microphone sensors 7.

As a variant, the number of microphone sensors 7 can, for example, be between three and sixteen, the number of microphone sensors being preferably greater than or equal to six and less than or equal to twelve.

Further, the sensors 7 cover a restricted surface 10; in particular, in the example of FIGS. 1 to 3, the maximum distance L1 between two sensors 7 of the plurality 6 of microphone sensors 7 is approximately equal to twenty centimeters.

This means that for any first sensor 7a selected from among the plurality 6 of microphone sensors 7 and any second sensor 7b selected from among the plurality 6 of microphone sensors 7, the maximum distance L1 between the first sensor and the second sensor is approximately equal to twenty centimeters.

As a variant, the maximum distance L1 between the first sensor and the second sensor can be less than or equal to fifty centimeters, and preferably less than or equal to thirty-five centimeters.

Finally, the sensors 7 are spaced from one another, i.e., they are separated by a minimum distance L2 that is greater than or equal to four centimeters.

Thus, for any first sensor 7a selected from among the plurality 6 of microphone sensors 7 and any second sensor 7c selected from among the plurality 6 of microphone sensors 7, a minimum distance L2 between the first sensor 7a and the second sensor 7c is greater than or equal to four centimeters.

Consequently, the number of microphone sensors 7 is not very high, and the surface 10 on which the plurality 6 of microphone sensors 7 extends is limited, which makes it possible to obtain a compact passive system for acoustic imagery 1.

The electronics of the passive system for acoustic imagery 1 are further simplified and lightened, which makes it possible that the passive system for acoustic imagery 1 is portable and lightweight.

Thus, for example, the passive system for broadband acoustic imagery 1 can exhibit a slight thickness dimension, said thickness dimension being considered in a direction of thickness, for example approximately perpendicular to the surface 10 on which the plurality 6 of microphone sensors 7 extends. Said thickness dimension is thus a cumulative dimension of all of the elements of the passive system for broadband acoustic imagery 1 and in particular of the passive device for acoustic acquisition 3, the digital processing unit 4, and the display means 5. More particularly, the thickness dimension of the passive system for broadband acoustic imagery 1 can be less than twenty centimeters, preferably less than ten centimeters, and still more preferably less than five centimeters.

The passive system for acoustic imagery can thus be easily moved by an operator and makes possible a facilitated exploration of the cluttered zones.

In the embodiment of the example of FIGS. 1 to 3, the plurality 6 of microphone sensors 7 is such that the sensors 7 are placed approximately on a circle 11.

In this way, the number of different distances separating two sensors 7 from among the plurality 6 of microphone sensors 7 is high, which increases the resolution of the passive system for broadband acoustic imagery 1.

Other shapes for the arrangement 11 of the sensors 7 will also be able to be employed, such as squares, polygons or other shapes exhibiting symmetries.

As a variant, non-symmetrical shapes will also be able to be employed, such as, for example, spirals.

In another embodiment, sensors 7 from among the plurality 6 of microphone sensors 7 are placed in the interior of said circle 11 so as to render more discrete the surface 10 on which the plurality 6 of microphone sensors 7 extends.

The passive device for acoustic acquisition 3 also has electronics for the processing and digitizing 12 of the electric signals 8.

The processing and digitizing electronics 12 are able to adapt the electric signals 8 generated by the microphone sensors 7 and to transform them into digital signals 13 of acoustic pressure 9.

Thus, in particular, the processing and digitizing electronics 12 perform the processing of the analog electric signals 8.

According to the embodiments of the invention, the processing and digitizing electronics 12 can therefore perform one or more operations from among the amplification of the electric signals 8, the prefiltering of the electric signals 8, the galvanic isolation of the sensors 7, and the excitation of the sensors 7.

The processing and digitizing electronics 12 further transform the electric signals 8 into digital signals 13 of acoustic pressure 9, for example by means of analog-digital converters.

In an embodiment of the invention, the processing and digitizing electronics 12 can be incorporated into the microphone sensor 7, for example to form a digital sensor uniting an acoustic microphone sensor and an integrated circuit-based interface.

The passive device for acoustic acquisition 3 also has transfer electronics 14 able to communicate with the digital processing unit 4.

The transfer electronics 14 make possible the transfer of the digital signals 13 of acoustic pressure 9 from the processing and digitizing electronics 12 to the digital processing unit 4.

The transfer electronics 14 can also make possible the monitoring of the passive device for acoustic acquisition 3, and in particular of the processing and digitizing electronics 12, by the digital processing unit 4.

In the embodiment of FIGS. 1 to 3, the transfer electronics 14 are wire transfer electronics having a connector 15 and able to communicate with the digital processing unit 4 by an interconnection cable 16.

As a variant, the transfer electronics 14 can be wireless transfer electronics having an antenna or an optical emitter-receiver and able to communicate with the digital processing unit 4 by means of a wireless connection, in particular a wireless radiofrequency connection or a wireless optical connection.

Finally, the passive device for acoustic acquisition 3 has a multifunctional rigid support element 17 on which the microphone sensors 7 and the transfer electronics 14 are mounted.

The multifunctional rigid support element 17 further incorporates the processing and digitizing electronics 12.

In the example of FIGS. 1 to 3, the multifunctional rigid support element 17 has two rigid shells 18, 19 attached facing one another and containing between them the processing and digitizing electronics 12.

In an alternative embodiment, the multifunctional rigid support element 17 can have a single rigid shell in which the processing and digitizing electronics 12 are housed.

The rigid shell or shells 18, 19, of the multifunctional rigid support element 17 can further be perforated to reduce the weight of the passive device for acoustic acquisition 3.

In the example of FIGS. 1 to 3, the multifunctional rigid support element 17 has a plurality 20 of receptacles 21.

Each sensor 7 from among the plurality 6 of microphone sensors 7 is mounted in an associated receptacle 21 from among the plurality 20 of receptacles 21.

The multifunctional rigid support element 17 can also have a means for association 22 with the digital processing unit 4 that is able to attach the digital processing unit 4 rigidly to the multifunctional rigid support element 17.

Advantageously, the means for association 22 with the digital processing unit 4 can be a detachable means, in particular a means that is easily detachable by a user of the passive system for broadband acoustic imagery 1.

The means for association 22 with the digital processing unit 4 can, for example, comprise a Velcro strip, or an interlocking mechanism that can be operated by a user.

Thus, in the example of FIGS. 1 to 3, the means for association 22 comprises self-gripping straps 22a, 22b suited respectively to be fastened: the first ones 22a on the digital processing unit 4 and the others 22b on the multifunctional rigid support element 17.

The digital processing unit 4 can therefore be fastened rigidly to the multifunctional rigid support element 17.

The passive system for broadband acoustic imagery 1 then constitutes a single, rigid and compact unit that can be transported with one hand by a user.

For this purpose, the multifunctional rigid support element 17 can have a grasping means 23 that can make possible the handling and carrying of the acoustic acquisition device 3 with one or two hands.

The grasping means 23 can in particular have a zone or zones 24 of a rigid shell or shells 18, 19 that is or are reinforced, if necessary, by reinforcements that are inside the rigid shells 18, 19.

Finally, the multifunctional rigid support element 17 can have a means for fastening 25 to an external support, in particular to a tripod stand.

The passive device for acoustic acquisition 3 of the example of FIGS. 1 to 3 further has two distance sensors 26 incorporated into the multifunctional rigid support element 17.

The distance sensors 26 can be optical distance sensors incorporated into the multifunctional rigid support element.

As a variant, the distance sensors 26 can be ultrasound sensors or laser sensors.

The transfer electronics 14 can thus be able to transfer distance data 27 obtained by the distance sensors 26 to the digital processing unit 4.

The passive device for acoustic acquisition 3 can have an autonomous electric power source 28 incorporated into the multifunctional rigid support element 17.

Such an autonomous electric power source 28 can in particular be a battery.

As a variant, a power cable, for example the interconnection cable 16, can make possible the supply of electric power of the passive device for acoustic acquisition 3 by the digital processing unit 4.

With reference to FIG. 3, the passive device for acoustic acquisition 3 is therefore able to acquire electric signals 8 that are representative of acoustic pressures 9 received by the plurality 6 of microphone sensors 7, to adapt them and to transform them into digital signals 13 of acoustic pressure 9 by means of the processing and digitizing electronics 12, and to transfer the digital signals 13 to the digital processing unit 4 by means of the transfer electronics 14.

The digital processing unit 4 thus receives the digital signals 13 of the passive device for acoustic acquisition 3.

For each of the points 29 of a plurality 30 of points 29 of the observation zone 2, the digital processing unit 4 then determines, and stores, at least one digital value 31 of the acoustic pressure level 32 at this point 29 from the digital signals 13.

Here, "digital value of the pressure level" is defined as a representative digital magnitude of the pressure at the level of the point considered.

In particular, this digital magnitude can be expressed in units of pressure (for example, Pascals), of acoustic level (for example, decibels), of psychoacoustic units such as Sone, Phone, or else Acum, or in any other unit that is appropriate to quantify a pressure, an acoustic pressure level, or even a derivative or a time integration of an acoustic pressure.

To do this, the digital processing unit 4 uses, for example, an algorithm of acoustic holography and/or of path formation (in English, "beamforming").

The display means 5 then displays a grid 33 of the digital values 31 of the acoustic pressure level 32 associated with each point 29 of the observation zone 2.

Thus, for example, the display means 5 displays, for each digital value 31, one or more pixels 34 whose color and/or luminous intensity are functions of the associated digital value 31.

A scale of levels of gray or of colors can, for example, make it possible to represent the digital values 31.

The display means 5 can have a touch screen 35 on which the user can enter commands 36, so as to make possible the communication of commands 36 to the digital processing unit 4.

The transfer electronics 14 can further make possible the transmission of the commands 36 or of commands defined by the digital processing unit 4 from the digital processing unit 4 to the passive device for acoustic acquisition 3, and in particular to the processing and digitizing electronics 12.

The passive system for acoustic imagery 1 of the example of FIGS. 1 to 3 has in addition a means for acquisition of photographic images 37 making it possible to obtain at least one photographic image 38 of the observation zone 2.

The means for acquisition of photographic images 37 can, for example, be a digital camera.

The display means 5 is further able to display the photographic image 38 of the observation zone 2 and the grid 33 of the digital values 31 of the acoustic pressure level 32.

The display means 5 can, for example, display the grid 33 in the form of a palette of colors or of a level of gray superposed on the photographic image 38.

In the embodiment of FIGS. 1 to 3, the means for acquisition of photographic images 37 and the plurality 6 of microphone sensors 7 are respectively placed on opposite faces 39, 40 of the multifunctional rigid support element 17.

The multifunctional rigid support element 17 can then have a through opening 41, placed opposite the means for acquisition of photographic images 37 and making it possible for the means for acquisition of photographic images 37 to acquire an image of the observation zone 2.

The through opening 41 is, in particular, advantageous when the observation zone 2 is located on the side of the face 39 of the multifunctional rigid support element 17 opposite the face on which the digital processing unit 4 and the means for acquisition of photographic images 37 are attached.

In an advantageous embodiment, a mobile apparatus 42 comprises the digital processing unit 4, the display means 5, and the means for acquisition of photographic images 37.

The mobile apparatus 42 can be, for example, a smartphone or mobile telephone, a portable computer, a touch tablet or any other transportable apparatus comprising a processor, a screen, and a camera.

In this way, the passive system for acoustic imagery 1 can employ the easily available compact technologies.

The mobile apparatus 42 can, in particular, have an autonomous electric power source 43, for example a battery.

Thus, in the embodiment of FIGS. 1 to 3, the mobile apparatus 42 and the plurality 6 of microphone sensors 7 are respectively placed on opposite faces 39, 40 of the multifunctional rigid support element 17.

In an embodiment of the invention, the passive device for acoustic acquisition 3 is supplied with electric power by the digital processing unit 4, for example the mobile apparatus 42.

The invention claimed is:

1. Passive device for broadband acoustic acquisition able to communicate with a digital processing unit, the device having
    a plurality of microphone sensors, each of the sensors being able to generate an electric signal that is representative of an acoustic pressure received by said microphone sensor,
    wherein the plurality of microphone sensors comprises a number of microphone sensors greater than or equal to six and less than or equal to twelve,
    wherein for any first sensor selected from among the plurality of microphone sensors and any second sensor selected from among the plurality of microphone sensors:
    i) a maximum distance (L1) between the first sensor and the second sensor is less than or equal to thirty-five centimeters, and
    ii) a minimum distance (L2) between the first sensor and the second sensor is greater than or equal to four centimeters,
    electronics for processing and digitizing electric signals that are able to adapt the electric signals generated by the microphone sensors and to transform them into digital signals of acoustic pressure,
    transfer electronics able to communicate with a digital processing unit and to make possible the transfer of the digital signals of acoustic pressure from the electronics for processing and digitizing to said digital processing unit, and
    a multifunctional rigid support element that incorporates the electronic for processing and digitizing, wherein the microphone sensors and the transfer electronics are mounted on the multifunctional rigid support element, and
    wherein the sensors are placed approximately on a plane surface so that a thickness dimension of the passive system in a direction of thickness, approximately perpendicular to the surface on which the plurality of microphone sensors extends, is less than five centimeters.

2. Passive device for acoustic acquisition according to claim 1, wherein sensors from among the plurality of microphone sensors are placed approximately in a circle.

3. Passive device for acoustic acquisition according to claim 1,
    wherein the multifunctional rigid support element has a plurality of receptacles,
    and wherein each sensor from among the plurality of microphone sensors is mounted in an associated receptacle from among the plurality of receptacles.

4. Passive device for acoustic acquisition according to claim 1, further having at least one distance sensor incorporated in the multifunctional rigid support element.

5. Passive device for acoustic acquisition according to claim 1, wherein the multifunctional rigid support element has a means for association with a digital processing unit that is able to attach a digital processing unit rigidly to the multifunctional rigid support element.

6. Passive device for acoustic acquisition according to claim 1, having one of the following elements:
    the multifunctional rigid support element has a rigid shell in which the processing and digitizing electronics are housed,
    the multifunctional rigid support element has two rigid shells attached opposite one another and containing between them the processing and digitizing electronics, and/or
    the multifunctional rigid support element is perforated.

7. Passive device for acoustic acquisition according to claim 1, wherein the multifunctional rigid support element has at least one of the following elements:
    a grasping means able to make possible handling and carrying of the acoustic acquisition device with one or two hands, in particular a zone or zones of a rigid shell or of rigid shells,
    a means for fastening to an external support, in particular to a tripod stand, and/or
    an autonomous electric power source incorporated in the multifunctional rigid support element, in particular a battery.

8. Passive device for acoustic acquisition according to claim 1, wherein the transfer electronics are:
    either wire transfer electronics having a connector and able to communicate with the digital processing unit by an interconnection cable,
    or wireless transfer electronics having an antenna or an optical emitter-receiver and able to communicate with the digital processing unit by means of a wireless connection, in particular a wireless radiofrequency connection or a wireless optical connection.

9. Passive device according to claim 1, wherein the plurality of microphone sensors equals exactly eight microphone sensors.

10. Passive device according to claim 1, wherein the maximum distance (L1) between the first sensor and the second sensor is equal to twenty centimeters.

11. Passive device according to claim 1, wherein the plurality of microphone sensors equal exactly eight of microphone sensors, and
   wherein the maximum distance (L1) between the first sensor and the second sensor is equal to twenty centimeters.

12. Passive device according to claim 1, wherein the plurality of microphone sensors define a perimeter and the electronics for processing and digitizing and the transfer electronics are mounted on the multifunctional rigid support element within an interior of the perimeter.

13. Passive device according to claim 1, wherein the plurality of microphone sensors define a circle and the electronics for processing and digitizing and the transfer electronics are mounted on the multifunctional rigid support element within on interior of the circle.

14. Passive system for broadband acoustic imagery of an observation zone, the system comprising
   a passive device for acoustic acquisition according to claim 1,
   a digital processing unit suited to receive digital signals of acoustic pressure from the passive device for acoustic acquisition and to determine and store, for each of the points of a plurality of points of the observation zone, at least one digital value of the acoustic pressure level at this point from the digital signals of acoustic pressure, and
   a means for displaying a grid of the digital values of the acoustic pressure level associated with each point of the observation zone.

15. Passive system for acoustic imagery according to claim 14, having one of the following elements:
   the digital processing unit is attached rigidly to the multifunctional rigid support element,
   and/or
   the passive device for acoustic acquisition is supplied with electric power by the digital processing unit.

16. Passive system for acoustic imagery according to claim 14, wherein the display means have a touch screen able to make possible the communication of commands to the digital processing unit.

17. Passive system for acoustic imagery according to claim 14, further having a means for acquisition of photographic images to obtain at least one photographic image of the observation zone,
   and wherein the display means are able to display the photographic image of the observation zone and the grid of the digital values of the acoustic pressure level, in particular in the form of a palette of colors or of the level of gray associated with the grid of the digital values and superposed with the photographic image.

18. Passive system for acoustic imagery according to claim 17, wherein a mobile apparatus comprises the digital processing unit, the display means, and the means for acquisition of photographic images, the mobile apparatus having an autonomous electric power source, in particular a battery, preferably in which the mobile apparatus and the plurality of microphone sensors are respectively placed on opposite faces of the multifunctional rigid support element, the multifunctional rigid support element having a through opening opposite the means for acquisition of photographic images able to make it possible for the means for acquisition of photographic images to acquire a photographic image of the observation zone.

19. Passive device for broadband acoustic acquisition that communicates with a digital processing unit, the device comprising:
   a multifunctional rigid support element;
   a plurality of microphone sensors arranged in a geometric arrangement and mounted on the multifunctional rigid support element, each microphone sensor able to generate an electric signal that is representative of an acoustic pressure received by said microphone sensor,
   wherein the plurality of microphone sensors comprises a number of microphone sensors greater than or equal to six and less than or equal to twelve,
   wherein for any first sensor selected from among the plurality of microphone sensors and any second sensor selected from among the plurality of microphone sensors, i) a maximum distance (L1) between the first sensor and the second sensor is less than or equal to thirty-five centimeters, and ii) a minimum distance (L2) between the first sensor and the second sensor is greater than or equal to four centimeters,
   wherein the sensors are placed approximately on a plane surface so that a thickness dimension of the passive system in a direction of thickness, approximately perpendicular to the surface on which the plurality of microphone sensors extends, is less than five centimeters;
   electronics for processing and digitizing electric signals that adapt the electric signals generated by the microphone sensors and to transform them into digital signals of acoustic pressure, the electronics for processing and digitizing being incorporated on the multifunctional rigid support element within an interior of the geometric arrangement; and
   transfer electronics that communicate with a digital processing unit and transfer of the digital signals of acoustic pressure from the electronics for processing and digitizing to said digital processing unit, the transfer electronics being mounted on the multifunctional rigid support element within an interior of the geometric arrangement.

20. Passive device according to claim 19, wherein the plurality of microphone sensors equals exactly eight microphone sensors and the geometric arrangement is one of the group consisting of a circle and a polygon.

* * * * *